United States Patent [19]

Meurer

[11] Patent Number: 5,378,378

[45] Date of Patent: Jan. 3, 1995

[54] METHOD OF AND APPARATUS FOR HELICAL INLET FLOW

[76] Inventor: Charles L. Meurer, 2389 Bitterroot La., Golden, Colo. 80401

[21] Appl. No.: 109,140

[22] Filed: Aug. 23, 1993

[51] Int. Cl.⁶ ............................................. B01D 21/24
[52] U.S. Cl. ..................................... 210/788; 210/801; 210/512.1; 210/519; 210/521
[58] Field of Search ............ 210/788, 801, 802, 512.1, 210/519, 521, 532.1, 538, 540, 541; 137/561 A

[56] References Cited

U.S. PATENT DOCUMENTS

| | | | |
|---|---|---|---|
| 1,102,463 | 7/1914 | Wyckoff | 210/519 |
| 1,493,861 | 5/1924 | Kusch | 210/519 |
| 1,793,510 | 2/1931 | Raymond | 210/519 |
| 3,706,384 | 12/1972 | Weijman-Hane | 210/519 |
| 4,148,731 | 4/1979 | Brigante | 210/223 |
| 4,194,976 | 3/1980 | Robinsky | 210/137 |
| 4,859,327 | 8/1989 | Cox et al. | 210/219 |
| 4,886,605 | 12/1989 | Herve | 210/519 |
| 4,957,628 | 9/1990 | Schulz | 210/519 |
| 5,013,435 | 5/1991 | Rider et al. | 210/262 |
| 5,101,849 | 4/1992 | Richard | 137/15 |
| 5,120,436 | 6/1992 | Reichner | 210/207 |
| 5,204,000 | 4/1993 | Steadman et al. | 210/519 |

*Primary Examiner*—Christopher Upton
*Attorney, Agent, or Firm*—Chester E. Martine, Jr.

[57] ABSTRACT

The energy of liquid and solids flowing in a basin toward a clarifier section is substantially reduced before the liquid and solids enter the clarifier section. The basin is provided with an inlet wall having an inlet opening adjacent the top thereof. A sheet having an arcuate, reverse "C" shape is mounted across the inlet opening with the open side of the "C" facing the inlet wall to receive the liquid and the solids therefrom. The sheet causes the liquid and the solids to flow in two helical paths toward opposite side walls of the basin, which flow dissipates some of the original kinetic energy of the inlet liquid and solids. The helically flowing paths of liquid and solids are discharged into the basin spaced from the side walls of the basin, which further dissipates some of the kinetic energy of the liquid and the solids. The discharged liquid and solids flow into a top of manifolds along side walls with low velocity, but with sufficient remaining kinetic energy to flow along such top, and gradually toward the bottom of the basin for entry at very low velocity into the clarifier section without forming a hydraulic jump at the ends of the manifold and with minimum disturbance of the solids-settling action of the clarifier.

22 Claims, 8 Drawing Sheets

METHOD OF AND APPARATUS FOR HELICAL INLET FLOW

BACKGROUND OF THE INVENTION

1. Field of the Invention

This invention relates to apparatus for promoting settling of solids from waste water, and more particularly to an inlet for dissipating the energy of incoming liquid and solids flowing into a basin, and distributing a reduced-energy flow of the liquid and the solids near the top of the basin, such that as the liquid and the solids flow downwardly to flow channels of a clarifier section the energy of the liquid and the solids is reduced enough to avoid substantial interference with counterflowing of solids settling to the bottom of the clarifier section.

2. Discussion of Prior Clarifiers

Clarifiers remove certain materials and particles from liquid. These materials are generally suspended in the liquid and can be removed under the force of gravity when the velocity of the liquid is substantially reduced. Since these materials are generally solid and are said to "settle" out of the liquid, they are referred to as "settleable solids". Such settleable solids may include naturally occurring materials (e.g., clay, silts, sand and dirt), chemical precipitants and biological solids. The word "solids" as used herein to describe the present invention refers to such settleable solids.

Clarifiers are used, for example, in water and waste water treatment plants. In water treatment, the water drawn from a water supply has various non-settleable colloidal solids therein. When mixed with chemicals, the colloidal solids and chemicals agglomerate to form settleable solids. In waste water treatment, the solids include organic solids, among other wastes. Water and waste water are treated in clarifiers to remove such settleable solids, thereby making the water clear and suitable for use, reuse, or for further treatment, such as tertiary treatment. The word "liquid" as used herein to describe the present invention refers to water and waste water. When reference is made to both such liquid and such settleable solids carried by the liquid, the term "influent" is used.

An object of water and waste water clarifiers is to create a low flow velocity in each of many flow channels to promote maximum settlement of the solids to the bottom of the clarifiers. Clarifiers typically include a large natural detention basin. Early clarifier basins (e.g., ponds) simply had a very large bottom surface area relative to the flow velocity of the influent flowing into the basin or pond through one or more inlet pipes. However, the large area took up too much space (footprint) in crowded urban areas.

Therefore, man-made basins were provided with more efficient structures for settling the solids. For example, concrete rectangular basins have been provided with vertical baffles extending longitudinally and from above the surface of the liquid to points spaced from the bottom of the basin to define clarifier sections in the basins. Transverse to such longitudinal baffles, cross (or inlet) baffles have extended from above the surface of the liquid to a point close to the bottom. The inlet baffles force the liquid to enter the clarifier section near the bottom of the basin. The space between such a cross baffle and a front wall of the basin is referred to as an inlet section of the clarifier.

The clarifier sections are the volume in which settling of the settleable solids takes place. Such clarifier sections have been provided with tubes or flat plates mounted at fixed or variable angles relative to the surface of the liquid. Considering the plates, they form multiple thin liquid flow channels within the detention basin. The plates are used in an attempt to minimize the area (footprint) of the basin in which the settling of solids occurs while increasing settling velocities. The plates extend below the bottom of the vertical barriers. With the above-described cross baffles, the influent flows along the bottom of the basin and then upwardly between the plates of the clarifier sections. The intended flow velocities between the plates would allow sufficient time for most of the solids to settle onto the plates. Ideally, the solids settle within a thin counterflow of liquid and then flow down the plates, past the bottoms of the vertical barriers, downwardly below the bottoms of the plates, and then settle further downwardly onto the bottom of the detention basin for collection. As the solids settle onto the bottom, the downward counterflow of liquid joins inflowing influent (with the non-settled solids therein) which flows upwardly from the bottom of the basin into the flow channels. Ideally, the settling occurs and clarified liquid flows out of the clarifier section through openings between and at the top of the plates.

In some cases, the inlet pipe to the basin has been provided with a diffuser section to assist the vertical baffles in directing the flow of influent across the bottom of the inlet section of the basin toward the side walls of the basin. Also, some effort has been made to improve the plates or tubes of a clarifier section in an attempt to increase the settling efficiency (in terms of the parts per million of solids removed from liquid flowing at a given velocity through the clarifier section). However, it appears to Applicant that insufficient attention has been given to the dynamics of fluid flow in the clarifier basin. For example, the above-described flow of the influent along the bottom of the clarifier basin tends to stir up the settled solids before they can be removed from the basin (e.g., by a suction device). Also, the influent upflow opposite to the downward counterflow tends to entrain the settling solids in the inflow. Both of these conditions tend to lower the efficiency of the clarifiers.

Also, although distributor sections are used to supply influent along the length of a clarifier section, many clarifier designs also permit relatively high influent flow velocities to exist in the basin directly within the distributor sections. The high velocity liquid flows to bottom inlets of the flow channels of the clarifier sections. For example, some prior clarifiers have used large distribution pipes extending longitudinally in the basin to supply the influent longitudinally along the clarifier section. However, such pipes usually have small openings which form jets of influent. The jets flow at high velocity, are pointed downwardly toward the bottom of the plates of the clarifier section, and cause high velocity streams of the influent to enter the flow channels of the clarifier sections. Because such jets flow to the bottom of the basin below the clarifier section, the jets stir up the previously settled solids which join the incoming new settleable solids. Similarly, Schulz U.S. Pat. No. 4,957,628 issued Sep. 18, 1990 uses side manifolds to supply the influent to the sides of clarifier section. However, there are also small openings in such manifolds, and the resulting jets discharged therefrom directly enter the flow channels and interfere with establishing the necessary low flow velocity in the clarifier section.

Others have used a square or rectangular manifold connected to an inlet pipe that extends in the longitudinal direction through the front wall of the basin. The manifold extends perpendicular to the inlet pipe and has opposite ends thereof closed. The liquid and the solids flow from the manifold into the basin through inlet orifices cut into the bottom of the manifold. Again, jets of influent are directed downwardly across the front wall of the basin and onto the bottom of the basin for flow under the cross baffle to the bottom of the plates of the clarifier section.

Examples of flow resulting from other inlet designs include the inlet baffle shown in U.S. Pat. No. 5,101,849 to Richard issued Apr. 7, 1992. In a rectangular basin, an inlet pipe extends into the front wall of the basin and is connected to a sleeve. The sleeve supplies a flow of influent to a vertically extending hollow baffle having an upper end closed by the top of the basin and an open lower end. The influent is directed out of the open lower end toward the bottom of the basin.

In still other inlet designs, the inlet pipe to a rectangular basin enters high on the front wall of the basin, opposite to a flat front surface of the cross baffle at the front of the clarifier section. The influent flows directly onto that cross baffle, and in a turbulent flow transition is thereby diverted transversely across and downwardly along the cross barrier. This establishes a complex flow pattern including substantial eddy currents which return toward the inlet pipe.

In Applicant's analysis, (1) these methods of flowing the influent at relatively high velocities into the clarifier, and (2) the high velocity jets supplying influent directly to the clarifier sections, have the following effects: (a) detract from the efficiency of the operation of the plates of the clarifier sections, and (b) generally decrease the efficiency of the entire clarifier due, for example, to the mixing of the jets with previously settled solids.

In cylindrical tank clarifiers, some inlets have been secured to the top of the tank and direct the influent tangentially relative to the curved wall of the tank. For example, in U.S. Pat. No. 5,120,436 to Reichnet issued Jun. 9, 1992, an inlet pipe is tangential to a cylindrical clarifier basin which has a conical clarifier section below the inlet pipe. The influent appears to continue in circular or swirling paths as it flows into and then in flow paths defined by plates of the conical clarifier section. As a result, it appears that the flow velocity of the influent to the clarifier section is relatively high, which lowers the efficiency of the clarifier.

In another variation of a cylindrical clarifier, in U.S. Pat. No. 4,859,327 issued Aug. 22, 1989 to Cox, et al., a cylindrical tank is provided with a propeller mixer located near the periphery of the cylindrical wall. The mixer maintains a strong circular current in the tank.

Finally, in a fluidized bed mixer having a vertical open inverted conical mixing section, influent liquid has been caused to flow tangentially and swirl in an upwardly circular path to mix particles therein and form a blanket of particles.

SUMMARY OF THE PRESENT INVENTION

Applicant has studied the dynamics of fluid flow in clarifiers in an endeavor to increase the efficiency of a clarifier section in settling solids in a clarifier basin. Such basin would have an inlet section, at least one clarifier section, and manifolds on opposite sides of the clarifier section. As a result of such studies, it appears to Applicant that the velocity of influent flowing into and within the basin and the manifold toward the clarifier section must be carefully controlled in order to achieve significantly improved efficiency of settling of solids (parts per million of solids settled at a given liquid inflow velocity) in the clarifier section. In particular, three flow-related factors of such control are: (1) the influent flow velocity, which Applicant's studies indicate should be relatively low just prior to the clarifier section, (2) in the clarifier section the interaction of counterflowing settled solids and liquid with inflowing unsettled solids and liquid, which Applicant's studies indicate should be at a lower flow velocity, and (3) the locations of such interactions, which Applicant's studies indicate should be selected to minimize disruption of the settling of the solids.

In the present invention, influent flow velocity is controlled by dissipating much of the kinetic energy of the influent at the top of the basin before it enters the top of the manifold leading to the central clarifier section. With the reduced kinetic energy, influent enters the top of the manifold, where much of the remaining kinetic energy of the influent is dissipated. This dissipation occurs as the influent flows to the end of the manifold and gradually downwardly to inlets of the clarifier section located above the bottom of the basin.

In particular, the influent is directed by a transverse tube into opposite helical transverse paths which dissipate much of the energy thereof. The influent from the helical paths then flows primarily along the top of the basin and longitudinally in the manifolds on either side of the clarifier section. The highest influent flow velocity in the manifolds is at the tops thereof. The flow velocity decreases as the influent flow extends further longitudinally along and downwardly in the manifolds.

In the present clarifier section the bottom ends of the clarifier section plates of the clarifier section extend a significant distance below the bottom of the longitudinal baffles. This extension allows the low flow velocity influent flowing downwardly in the manifolds to turn and flow horizontally at the low velocity into the clarifier section between the adjacent plates. Counterflow of the liquid and settled solids along the plates continues below the bottom of the longitudinal baffles along the full length of the plates. Such counterflow is relatively thin in that it occurs in about the first one-half inch adjacent to the lower plate of a flow channel. This leaves the remaining two or so inches of the width of the flow channel for receiving the horizontally flowing influent. Any settled solids entrained in the incoming horizontal influent are generally moved toward the center of the clarifier section where the settleable solids continue to settle. This reduces if not minimizes entraining of the previously settled solids at the bottom of the clarifier section with the incoming liquid and unsettled solids, increasing the efficiency of the clarifier section.

In contrast to prior clarifiers in which high influent flow velocities occur near the settled solids, the present invention contemplates dissipation of much of the kinetic energy of influent before it enters a clarifier section.

The present invention seeks to provide methods of and apparatus for increasing the efficiency of clarifying liquid by placing a tubular transition duct horizontally across an inlet to a clarifier basin, and designing such duct to cause influent from such inlet to be divided into two helical flow paths.

The present invention provides a method of keeping the higher flow velocity of incoming influent generally along the top of a clarifier basin, and dissipating much of the kinetic energy of such influent before it flows down into inlets of a clarifier section.

The present invention also contemplates using a single sheet of arcuate material placed in tension across an inlet to a clarifier basin, and shaping such sheet to cause influent flowing in such inlet to assume a helical transverse flow path and dissipate much kinetic energy of the influent before flowing toward a manifold and then toward a clarifier section in such basin.

With these and other considerations in mind, the present invention relates to methods of and apparatus for increasing the efficiency of clarifying liquid. The velocity, and thus the kinetic energy, of influent flowing in a basin toward a clarifier section is substantially reduced before the influent enters the clarifier section. The basin is provided with an inlet wall having an inlet opening adjacent to the top thereof. A sheet having an arcuate, reverse "C" shape is mounted by its transverse edges across the inlet opening with the open side of the "C" facing the inlet wall. The influent from the inlet enters the open side of the sheet and places the sheet in tension. The sheet causes the influent to flow in two helical paths toward opposite side walls of the basin, which helical flow dissipates some of the original kinetic energy of the influent. The helically flowing paths of influent are discharged into the basin at points spaced from the side walls of the basin, which further dissipates more of the energy of the influent. The discharged influent has sufficient remaining energy to flow primarily along the top, and gradually toward the bottom, of manifolds for entry horizontally and transversely into the clarifier section with minimum disturbance of the solids-settling action of the clarifier section.

BRIEF DESCRIPTION OF THE DRAWINGS

Other objects, features and advantages of the present invention will be apparent from an examination of the following detailed descriptions, which include the attached drawings in which.

DETAILED DESCRIPTION

Prior Art Clarifier 28

Figure 1:
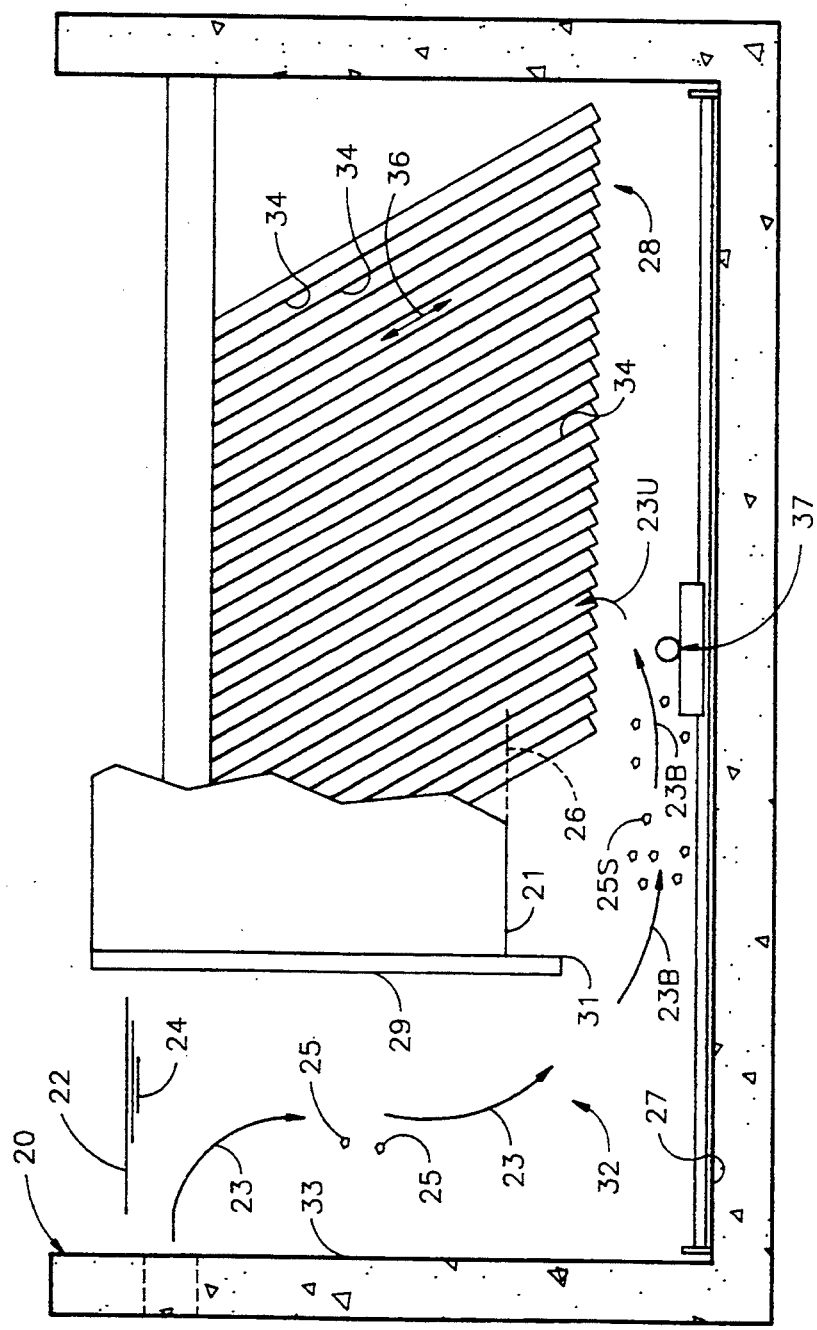
FIG. 1 shows a prior art basin in which a cross baffle directs incoming influent to a bottom of the basin for flow along the bottom into a clarifier section.

Referring to FIG. 1, there is shown a concrete rectangular basin 20 provided with vertical baffles 21 extending longitudinally and from above a surface 22 of influent 23 (liquid 24 and settleable solids 25 suspended therein). The baffles 21 extend to a bottom end 26 (shown dashed) spaced from a bottom 27 of the basin 20 to define a clarifier section 28 in the basin 20. Transverse to such baffles 21, a cross baffle 29 extends from above the surface 22 to an end 31 close to the bottom 27 and forces the influent 23 to enter the clarifier section 28 near the bottom 27 of the basin 20. An inlet section 32 is defined between such cross baffle 29 and a front wall 33 of the basin 20.

The clarifier section 28 is shown provided with flat plates 34 mounted at a fixed angle relative to the surface 22 of the influent 23. The plates 34 form multiple thin flow channels (see arrow 36) within the basin 20 in an attempt to minimize the area (footprint) of the basin 20 in which the settling of the solids 25 occurs. The plates 34 extend below the end 26 of the vertical side baffles 21. Due to the cross baffles 29, the influent 23 flows along the bottom 27 of the basin 20 before flowing upwardly (see arrow 23U) between the plates 34. The clarifier section 28 is designed in an attempt to have flow velocities of the influent 23 between the plates 34 be low enough to allow sufficient time for most of the incoming settleable solids 25 to settle onto the plates 34, and to then settle to the bottom 27 of the basin 20 for collection by a suction device 37. In practical use of such clarifier sections 28, the influent 23 flowing under the cross baffle 29 (shown by arrows 23B) disturbs the settled solids 25S, causing them to again mix with the influent 23, requiring another settling operation to remove the settleable solids 25 from the liquid 24. This decreases the overall efficiency of the clarifier section 28.

Basin 20 Of the Present Invention

Figure 2:
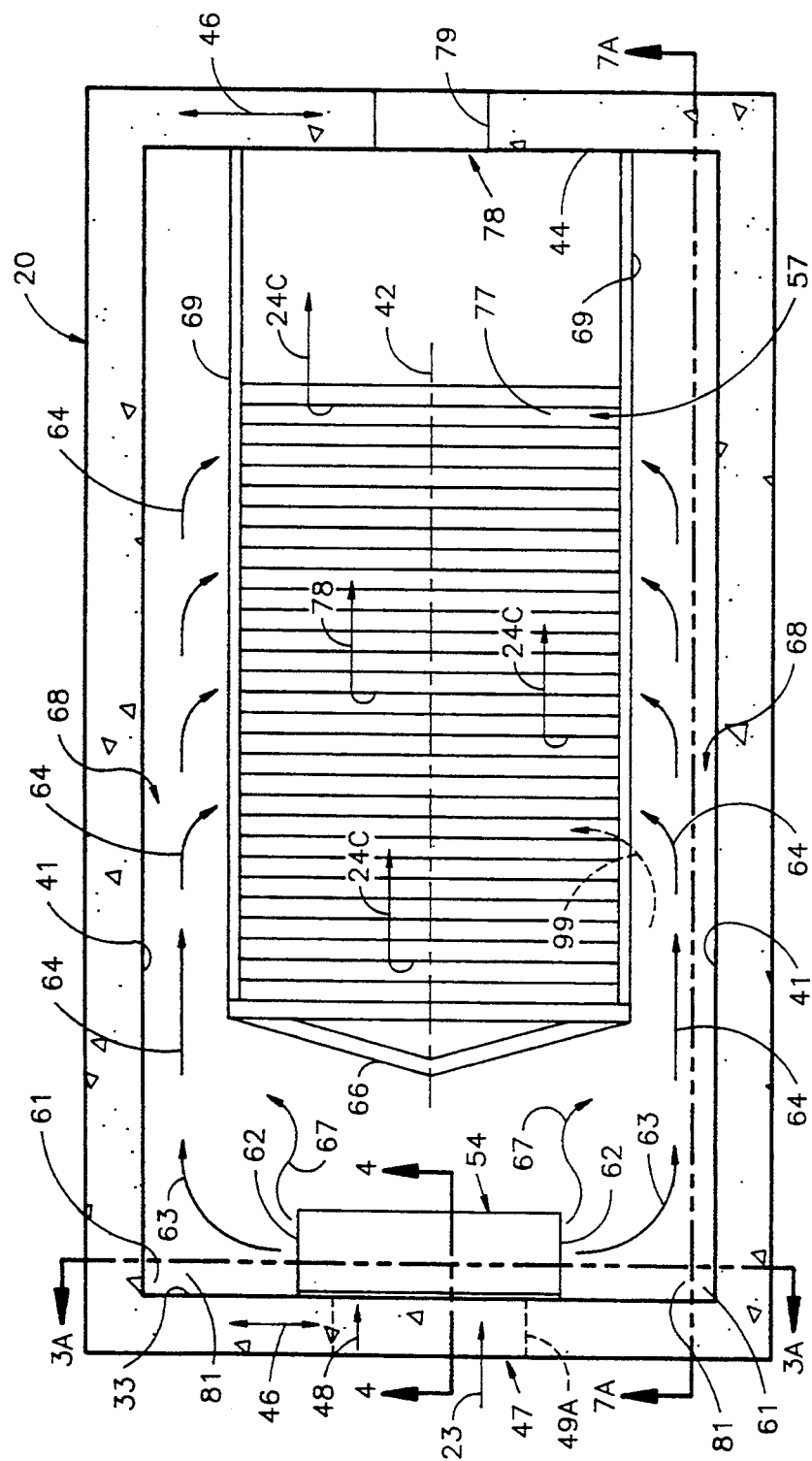
FIG. 2 is a plan view of a basin of the present invention showing helical transverse flow paths of influent exiting a transition duct of the present invention.
Figure 5:
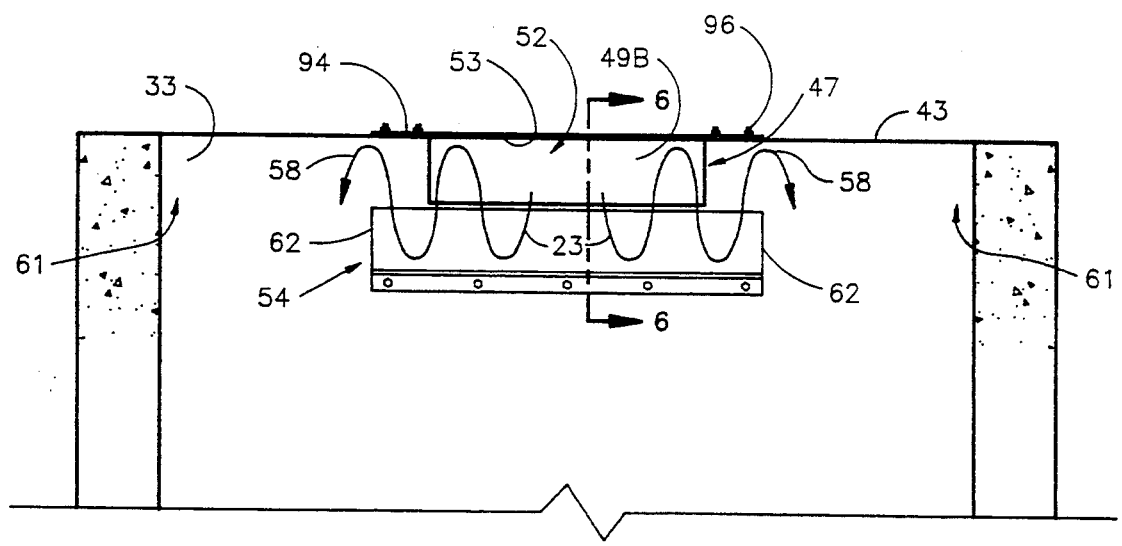
FIG. 5 shows a second embodiment of the transition duct for use with an inlet opening that is formed in the top of the basin.
Figure 6:
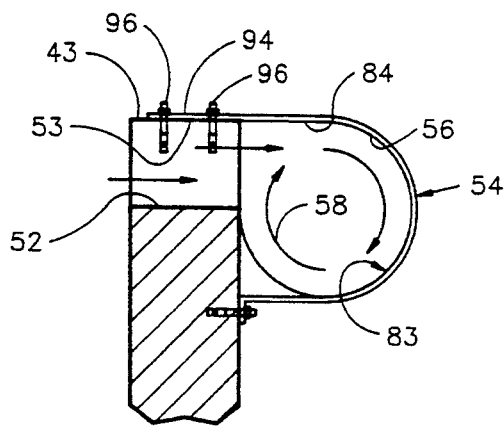
FIG. 6 shows a cross sectional view of the duct shown in FIG. 5.
Figure 7A:
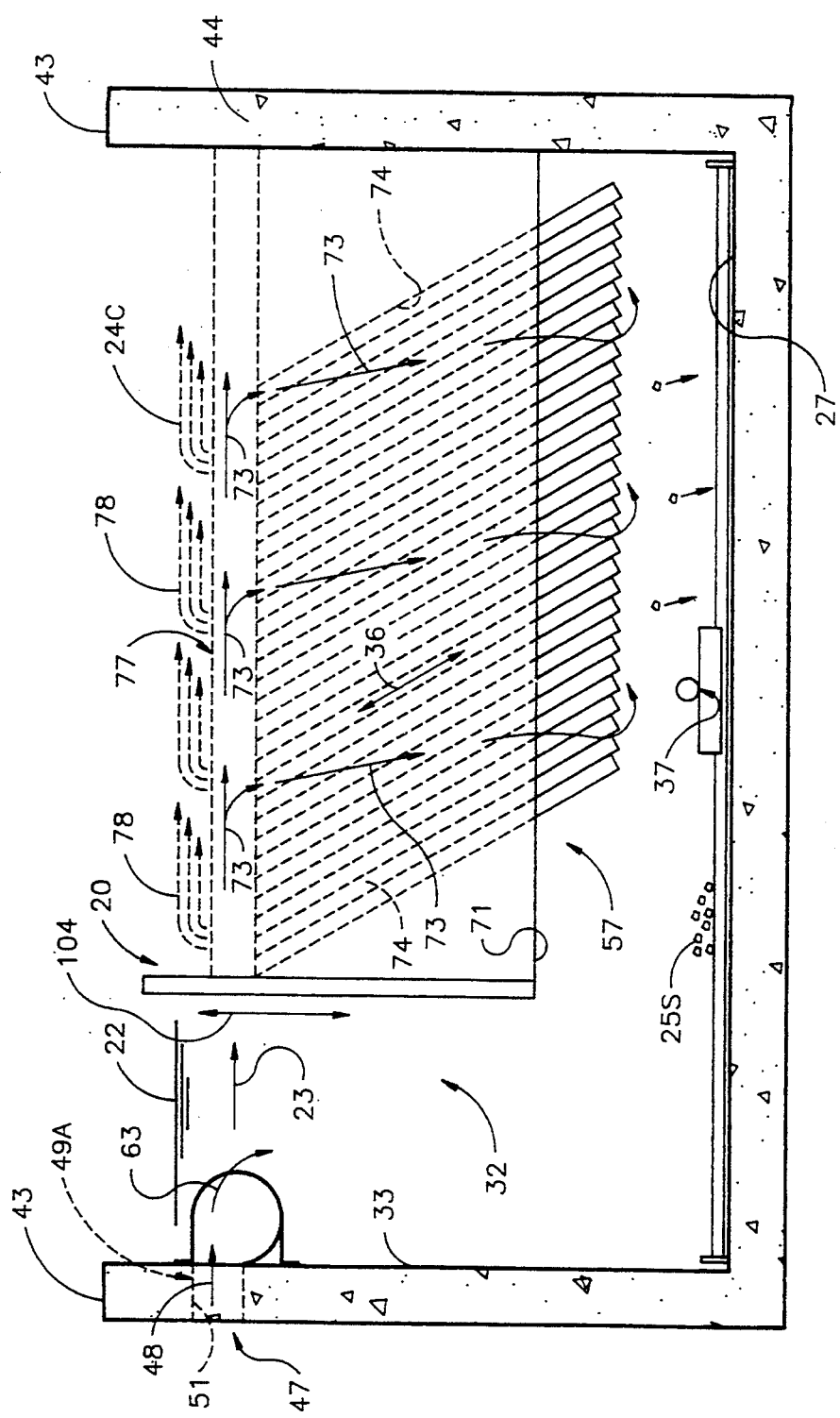
FIGS. 7A and 7B are vertical cross sectional views of the influent flowing at low velocity downwardly in a manifold, and then intersecting counterflows of settled solids.
Figure 7B:
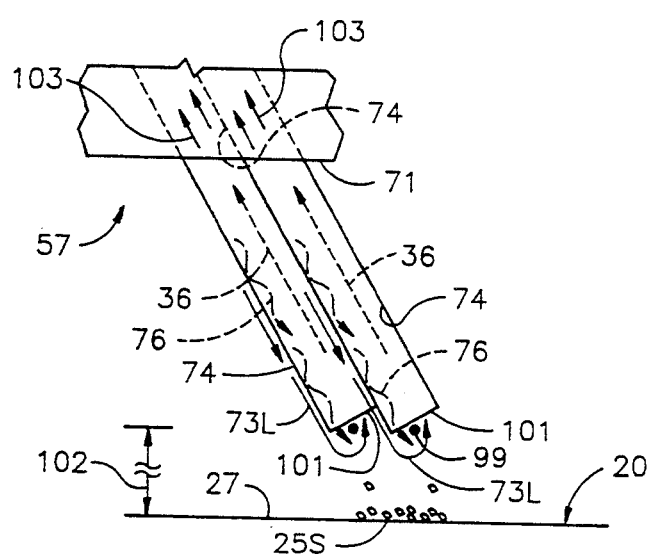

Referring to FIGS. 2, 7A and 7B, elements which are the same as in FIG. 1 have the same reference numbers. The basin 20 of the present invention is shown having the bottom 27 and spaced side walls 41 (FIG. 2) extending parallel to a longitudinal axis 42 and upwardly from the bottom 27 to a top 43. The basin 20 has an end, or rear, wall 44, and the front (or inlet) wall 33 spaced longitudinally from the rear wall 44. The front wall 33 and the rear wall 44 each have the top 43 and extend in a direction (see arrow 46) transverse to the longitudinal axis 42. The bottom 27 and the respective walls 33, 41 and 44 contain the influent 23. The front wall 33 has an inlet 47 formed therein adjacent to the top 43 for supplying the influent 23 to the basin 20 in a flow path (see arrow 48) parallel to the longitudinal axis 42. The inlet 47 is shown in two embodiments, one in FIGS. 3A, 3B and 4, in which an opening 49A of the inlet 47 is formed as a hole in the front wall 33 to provide an upper inlet surface 51. The other embodiment is shown in FIGS. 5 and 6, wherein the opening 49B is formed as a notch 52 in the top 43 of the front wall 33 so that an upper surface 53 of the influent 23 is flush with the top 43 of the front wall 33.

A transition duct 54 has an inner surface 56 described in detail below and is provided for dissipating much of the kinetic energy of the influent 23 so that such influent 23 has less disruptive effect on the operation of a clarifier section 57 than the influent flowing into the clarifier section 28 in FIG. 1. The inner surface 56 of the duct 54 changes the first longitudinal flow path 48 of the influent 23 into oppositely directed transversely extending flow paths shown by arrows 58. The influent 23 in each of the transversely extending flow paths 58 flows helically and transversely from the inlet 47 into upper corners 61 (FIG. 2) of the basin 20 spaced from each of two outlet ends 62 of the transition duct 54. As shown in FIG. 2, the helical flow paths 58 are turned (see arrows 63) in the upper corners 61 so that the influent 23 near each side 41 assumes a flow path (see arrows 64) in the direction of the longitudinal axis 42.

Figure 3A:
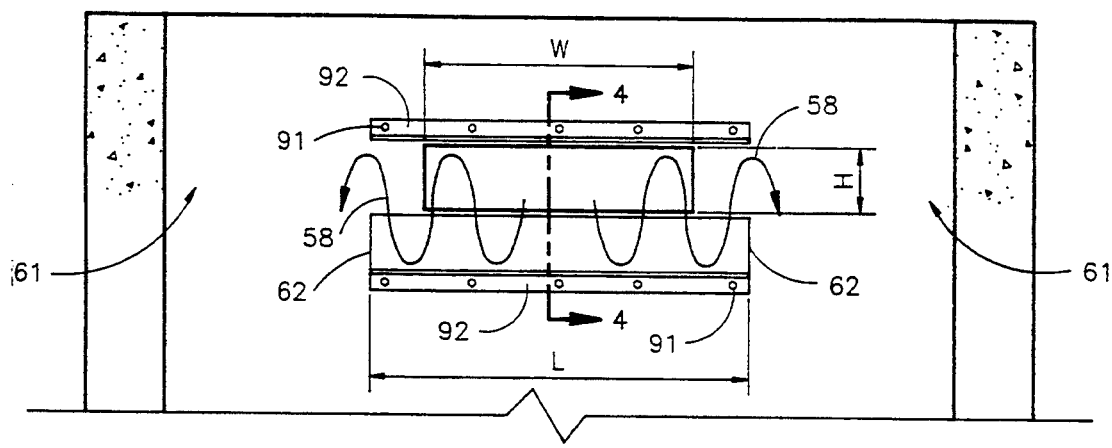
FIG. 3A shows a first embodiment of the transition duct for use with an inlet opening that is below but near a top of the basin.

A cross baffle 66 shown in FIGS. 2 and 3A extends in the direction 46 and is spaced from the front wall 33 to define the inlet section 32 of the basin 20. The cross baffle 66 diverts the influent 23 which may flow (FIG. 2, see arrows 67) centrally in the inlet section 32 so that all of the influent 23 flows as shown in FIG. 2 in one of the two longitudinal flow paths (see arrows 64) along one or the other of the side walls 41. The influent 23 in the longitudinal flow paths 64 enters manifolds 68 defined by one side wall 41 and an adjacent spaced vertically extending baffle 69 which also extends in the direction of the longitudinal axis 42 on opposite sides of the clarifier section 57. As shown in FIG. 7A, each baffle 69 has a bottom 71 spaced from the bottom 27 of the basin 20, and as shown in FIG. 2, cooperates with one of the side walls 41 to form one of the manifolds 68 as an open-top longitudinally extending structure for distributing the influent 23 all along the clarifier section 57 to the rear wall 44. As shown in FIG. 7A, as the influent 23 flows toward the rear wall 44, some of the influent 23 flows downwardly (see arrows 73 and curved arrow lines 64 in FIG. 2) in the manifold 68 toward the bottom 27 of the basin 20.

Clarifier Section 57 of the Present Invention

The clarifier section 57 has adjacent plates 74 (or tubes) which define the flow channels (shown in FIG. 7B by dashed arrows 36) for the influent 23. The settleable solids 25 settle from the liquid 24 as both flow upwardly in the flow channels 36. Counterflows of liquid and settling solids (shown by wiggling dashed arrows 76 in FIG. 7B) descend between the adjacent plates 74. The settling solids 25 are shown settling to the bottom 27 of the basin 20 (FIG. 7B) for collection by the device 37 (FIG. 7A). Having settled most of the solids 25 from the incoming liquid 24, relatively clear liquid 24C flows out of a top 77 of the clarifier section 57 (see arrows 78 in FIGS. 2 and 7A) and exits the basin 20 through an outlet 79 (FIG. 2). The velocity of flow of the clarified liquid 24C is high relative to the flow velocity in the separate flow channels 36.

Transition Duct 54

Referring to FIG. 2, the transition duct 54 is shown centered between the opposite side walls 41 so that there is a space 81 between the opposite ends 62 of the duct 54 and the side walls 41. The corner 61 is defined on each side of the basin 20 by the front wall 33 and one side wall 41. In FIG. 3A the opening 49 of the inlet 47 is shown as an elongated hole located below the top 43 of the front wall 33. The opening 49 has a width W of about two feet and a height H of about one foot and typically admits a flow of seven-hundred gpm of influent 23 into the basin 20.

Figure 3B:
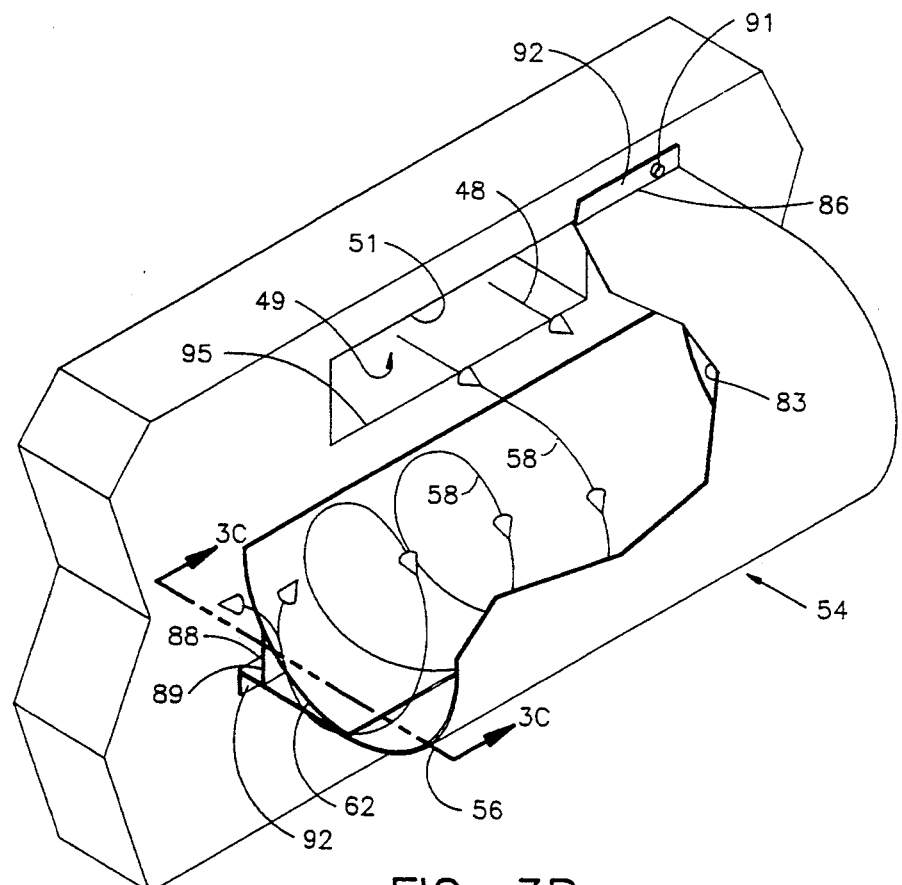
FIG. 3B is a three-dimensional view of one of the helical flow paths of the influent at one end of the transition duct.
Figure 3C:
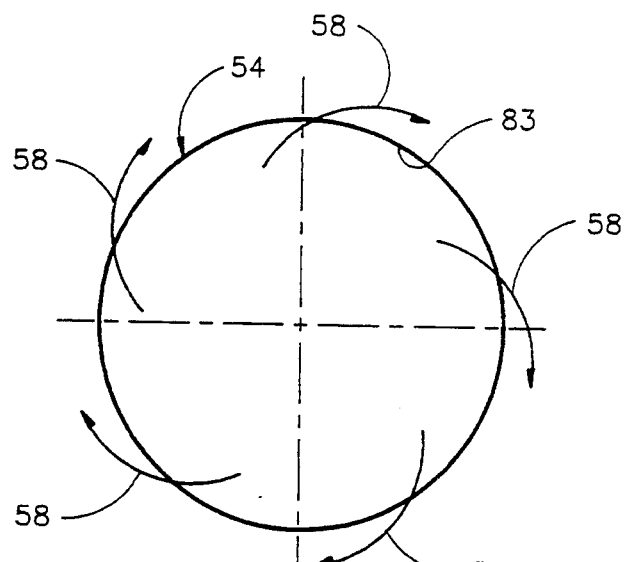
FIG. 3C is an end view taken along lines 3C in FIG. 3B, showing influent in one of the helical flow paths exiting an end of the transition duct.
Figure 4:
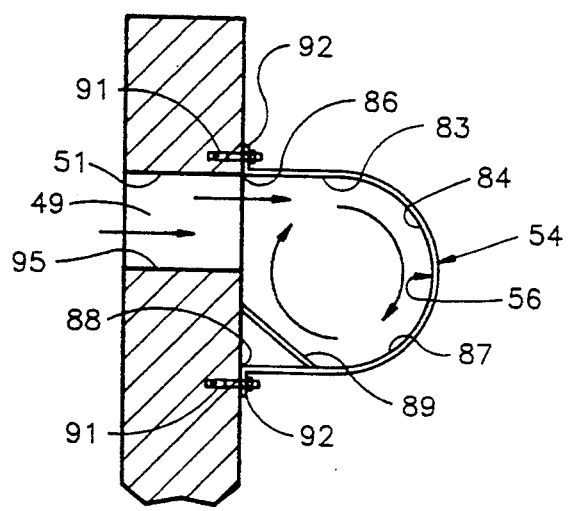
FIG. 4 shows a cross sectional view of the duct shown in FIGS. 3A, 3B and 3C.

As shown in FIGS. 3B and 4, the duct 54 is formed from a single sheet 83 which has an arcuate shape generally in the form of a reverse "C" and is provided with an upper arcuate section 84 extending from a first edge 86. The upper arcuate section 84 initially extends in the direction of the longitudinal axis 42 and then curves downwardly to join a lower arcuate section 87 of the duct 54. The lower section 87 extends down and curves back generally in the direction of the longitudinal axis 42 to a second edge 88 below the opening 49 in the front wall 33. The inner surface 56 of the sheet 83 is almost a full cylinder by means of the arcuate sections 84 and 87 and an arcuate insert (shown in FIG. 4 as an elongated flat strip 89) which rounds the lower arcuate section 87 of the sheet 83 adjacent to the front wall 33.

In FIGS. 3B and 4 the duct 54 is shown mounted to the front wall 33 by bolts 91 which extend through tabs 92 on the respective edges 86 and 88 of the sheet 83. As seen in FIG. 4, only the edges 86 and 88 are connected to the front wall 33, so that the influent 23 applies force to the sheet 83 in the direction of the longitudinal axis 42, placing the sheet 83 in tension between the tabs 92. The upper section 84 of the sheet 83 is shown in FIG. 4 horizontally aligned with and facing the upper surface 51 of the opening 49 so that there is a smooth transition of the influent 23 from the opening 49 into the duct 54. If the opening 49 has the height H, then the duct 54 is provided with a diameter of about one and one-half to two times H. With this dimensioning, the lower arcuate section 87 of the duct 54 extends (FIG. 4) below a bottom 95 of the opening 49. The duct 54 thus covers the opening 49 and the inner surface 56 is effective as if it were a continuous three hundred sixty degree curve. In FIG. 3A the opening 49 is shown having the width W, and the duct 54 is shown having a length L in the transverse direction 46, where L is twice that of W.

The basin 20 may also have the opening 49B formed as the notch 52B shown in FIGS. 5 and 6 where the top of the opening 49B is flush with the top 43 of the front wall 33. In this embodiment, a tab 94 of the duct 54 extends onto the top 43 and bolts 96 extend into the top 43 of the front wall 33 to secure the duct 54 to the wall 33 with the upper arcuate section 84 horizontally aligned with the top 43 of the front wall 33. Thus, the sheet 83 of the duct 54 bridges the notch 52 as shown in FIG. 5 and covers the opening 49B to receive the influent 23.

Multiple Clarifier Sections 57

Figure 8:
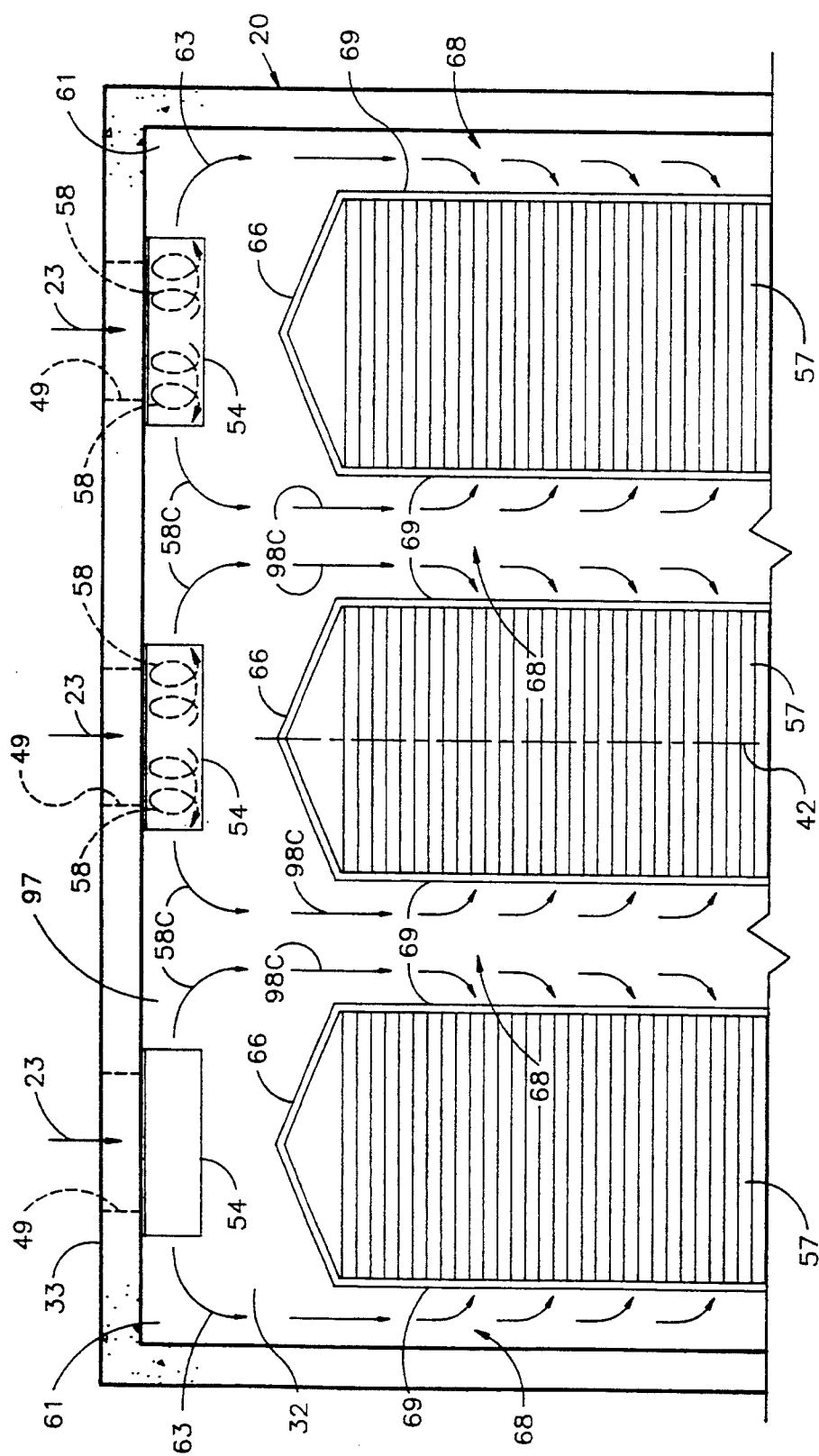
FIG. 8 is a plan view of a basin having a plurality of clarifier sections, with each section provided with a transition duct of the present invention.

Referring to FIG. 8, a plurality of clarifier sections 57 are shown in the basin 20. In this embodiment, one of the cross baffles 66 is provided with a bow-like shape in the inlet section 32. The bow-like shape extends from a point near the front wall 33 at an angle relative to the longitudinal axis 42 for directing the influent 23 away from the center of the clarifier sections 57. Each cross baffle 66 joins the opposite longitudinal baffles 69 on opposite sides of the clarifier sections 57. The transition ducts 54 are provided at each of a plurality of openings 49 through the front wall 33 of the basin 20. The transition ducts 54 operate in the same way as the single duct 54 shown in FIGS. 2 and 4, for example, and transform the influent 23 into the transverse helical flow paths 58.

In this embodiment, adjacent oppositely flowing helical flow paths (shown by arrows 58C) intersect at a point 97. The front wall 33 is effective to divert the helical flow paths 58C along longitudinal paths shown by arrows 98C in FIG. 8 so that the helical flow paths 58 are turned and extend longitudinally between the baffles 69 into the manifolds 68.

Methods of Controlling the Flow of Influent 23

With the above structure of the present invention in mind, the flow of the influent 23 may be understood by reference to FIGS. 2 through 7B. Applicant has identified three flow-related factors as being important to the efficiency of the settling operation. In particular, (1) the velocity of the downward flow 73 (FIG. 7A), which in the present invention is low just prior to the bottoms 101 (FIG. 7B) of the clarifier sections plates 74 (as compared to the velocity of the influent 23 in the paths 64 in the manifold 68 near the top 43), (2) the interaction of the downward counterflow 76 (of the settling solids 25 and the liquid 24) with transverse horizontal influent inflow 99 shown in FIG. 2 (of unsettled solids 25 and liquid 24) into the clarifier section 57, which in the present invention is at a still lower flow velocity, and (3) the locations of such interactions, which in the present invention are locations selected to minimize disruption of the settling of the solids 25.

Concerning the first factor, the duct 54 of the present invention receives influent at a velocity of about one foot per second. The duct 54 is shaped and dimensioned to split the longitudinal influent 23 in two and transform the influent 23 into the two helical transverse flow paths 58 shown in FIGS. 3A through 3C. The change in direction to transverse helical flow dissipates a substantial amount of the kinetic energy of the influent 23 which exists at the opening 49. The kinetic energy is defined as one-half rho times the square of the flow velocity, where "rho" is the mass per unit volume of the influent 23 moving at a "velocity". Thus, when the velocity is decreased, the kinetic energy has a greater decrease. The kinetic energy of the influent 23 exiting the opposite ends 62 of the duct 54 is reduced from that at the opening 49. Further, the helical and transverse flow 58 of the influent 23 is discharged into the corners 61 of the basin 20 where the influent 23 is not effectively constrained until the helical transverse flow 58 reaches the side walls 41. There is a further reduction of the kinetic energy of the influent 23 in the upper corners 61 as the helical transverse flow 58 of influent 23 is guided to turn (see arrows 63 in FIGS. 2 and 8) the corners 61. Despite these reductions in influent kinetic energy, the remaining kinetic energy of the influent 23 in the longitudinal flow paths 64 is sufficient to enable the influent 23 to flow primarily along the top 43 of the basin 20 in each manifold 68, and all the way to the rear wall 44. Importantly, because the influent velocity is very low at the end of the manifold 68, the flow of the influent 23 reaches the end wall 44 of the basin 20 without creating a hydraulic jump, which is a volume of the influent 23 having high pressure, and which would form at the juncture of the manifold 68 and the rear wall 44 were the velocity too high in the manifold 68. In other words, with the present invention, the pressure of the influent 23 at the rear wall 44 is just enough to provide the gradual downward flow of the influent 23 shown by the arrows 73 in FIG. 7A in the manifold 68 along the side walls 41 and along the vertical longitudinal baffles 69. Just past the bottom 71 of the baffles 69, as shown in FIG. 7B by the arrows 73L, the downward flow 73 turns and becomes a horizontal and transverse flow between the plates 74. Such flow is shown by dots 99 in FIG. 7B indicating transverse horizontal flow into the plane of the paper, and by dashed arrows 99 in FIG.2 indicating such horizontal transverse flow.

The next flow-related factor is the interaction of the downward counterflow 76 (of the settling solids 25 and the liquid 24) with such transverse horizontal influent inflow 99, which interaction involves the velocity of the flow 99 as such flow 99 meets the downwardly settling solids 25S. The lowest flow velocity of the influent 23 in the manifold 68 is the flow 99 just below the bottoms 71 of the baffles 69. In particular, as the influent 23 flows horizontally and transversely into the clarifier section 57 to interact with the counterflow 76, the influent 23 is at the lowest flow velocity in the basin 20 incoming to the clarifier section 57. As a comparison, the lowest flow velocity in the entire basin is in the flow channels 36 between adjacent plates 74 of the clarifier section 57.

Considering the location at which the influent 23 interacts with the settling solids 25S, reference is made to FIG. 7B. Bottom ends 101 of the plates 74 of the clarifier section 57 are positioned a significant distance, such as one-and-one-half feet, below the bottoms 71 of the longitudinal baffles 69. A distance 102 of about six feet is provided between the bottom ends 101 of the plates 74 and the bottom 27 of the basin 20. The thin counterflow (see wiggly dashed arrows 76 in FIG. 7B) of the liquid 24 and the settling solids 25S continues below the bottoms 71 of the longitudinal baffles 69 for the full length of the plates 74. Also, such counterflow 76 is relatively thin (e.g., one-half inch) and adjacent to the lower plate 74 of the flow channel 36. This leaves the remaining two and one-half inches or so of the width of the flow channel 36 for upflow (see dashed arrows 103 in FIG. 7B) of the influent 23. The interaction between (1) the influent 23 flowing in the horizontal transverse paths 99 between the plates 74 below the ends 101, and (2) the other flows between those plates 74, is primarily interaction with the approximately two and one-half inch wide upflow in the flow paths 36. The remainder of the interaction of the flow 99 is with the counterflow 76, and such interaction tends to carry some of the settling solids 25S to the center of the clarifier section 57, which is a minimal disturbance of the continuing settling of the settleable solids 25. It can be seen in FIG. 7B that the transverse flow 99 of the liquid 24 and the non-settled solids 25 is at the upper part of the distance 102 between the bottoms 101 of the plates 74 and the bottom 27 of the basin 20, such that there is minimal interference with the settled solids 25S on the bottom 27 of the basin 20. Thus, there is more opportunity for the suction device 37 (FIG. 7A) to remove the settled solids 25S from the basin 20.

It may be appreciated then, that the transition duct 54 initiates control of the velocity of the influent 23 to the manifold 68. Further, in combination with the manifold 68, the higher flow velocity of the influent 23 is in the upper third (see arrow 104 in FIG. 7A) of the manifold 68 between the side walls 41 and the longitudinal baffles 69. As the influent 23 flows downwardly (see arrows 73 in FIG. 7A) in the manifolds 68, the flow velocity decreases, such that by the time the influent 23 reaches the bottoms 71 of the longitudinal baffles 69 and turns to form the flows 99, the flow velocity is low relative to all of the other flow velocities in the basin 20 prior to the upflow in the flow channels 36.

It is to be understood that the scope of the present invention is to be defined by the appended claims and not limited by the foregoing description, which describes the presently preferred ways in which the principles of the present invention may be embodied. Numerous other embodiments may be devised and still come within the scope of the present invention.

What is claimed is:

1. Apparatus for treating liquid, comprising:
   means for containing the liquid, said containing means having a longitudinal axis and a front wall transverse to said axis, said front wall having a top and an opening extending therethrough in the direction of said axis for admitting the liquid to said containing means adjacent to said top along a first longitudinal flow path having an upper boundary and a lower boundary; and
   means defining a surface for changing said first longitudinal flow path of the liquid into oppositely directed transversely extending flow paths, said changing means defining said surface to extend longitudinally from and coextensively with said upper boundary and then in an arcuate path downwardly and then rearwardly toward said front wall and then upwardly to provide means for causing the liquid in each of said transversely extending flow paths to flow helically and transversely from said opening into said containing means.

2. Apparatus according to claim 1, further comprising:
   said opening having a given vertical height;
   said changing means defining said surface as having an effective diameter of about 1.5 to 2 times the given vertical height of said opening.

3. Apparatus according to claim 1, further comprising:
   said opening having a selected width extending transverse to said longitudinal axis; and
   said changing means defining said surface as having a length extending transverse to said longitudinal axis, said length being about twice the amount of said selected width.

4. Apparatus according to claim 1, wherein said containing means has a cross baffle extending in a direction transverse to said longitudinal axis, said cross baffle being spaced from said front wall to define an inlet section in said containing means, further comprising:
   means on said cross baffle and extending from a point near said front wall away from said front wall at an angle relative to the longitudinal axis for directing the liquid away from the longitudinal axis.

5. Apparatus according to claim 1, further comprising:
   said containing means having a rear wall opposite to said front wall to define said containing means as having a length, said containing means also having a clarifier section and a distributor on each side of said clarifier section, said clarifier section and said distributor extending to said rear wall;
   said changing means defining said surface as having an effective diameter and a transverse length selected to provide means for flowing the liquid exiting said changing means into said distributors along the tops thereof to said rear wall and uniformly downwardly in said distributors without causing a hydraulic jump in said distributors adjacent to said rear wall.

6. Apparatus according to claim 5, further comprising:
   said containing means having a bottom;
   said distributor being defined by at least one baffle extending in the direction of said longitudinal axis adjacent to said clarifier section, said one baffle having a bottom spaced from said bottom of said basin; and
   said clarifier section having means for defining a plurality of flow channels, said defining means extending toward said bottom of said continuing means beyond said bottom of said baffle of said distributors such that
   said exiting liquid flowing downwardly in said distributors exits said distributors and flows transversely into said one baffle and above said bottom of said containing means.

7. Apparatus according to claim 1, further comprising:
   said changing means comprising a single sheet having first and second opposite ends, said first end of said sheet being secured to said front wall adjacent to said upper boundary, said second end being secured to said front wall adjacent to said lower boundary, said sheet being placed in tension between said first and second ends by said liquid changing from said longitudinal flow path to said transversely extending flow paths.

8. Apparatus according to claim 1, further comprising:
   said containing means having a side wall on each side of said front wall, said front wall forming a corner with each of said side walls, said corner having a top coextensive with said top of said front wall; and
   said changing means having opposite ends, each said opposite end being spaced from one of said side walls to define a space adjacent to said corner for receiving said liquid flowing in said helical and transverse flow paths.

9. Apparatus according to claim 8, further comprising:
   said surface providing means for causing said liquid received in said space to dissipate a substantial amount of kinetic energy upon entering each of said spaces.

10. Apparatus for treating liquid and solids suspended in the liquid, said apparatus comprising:
    a basin having a bottom, spaced side walls extending parallel to a longitudinal axis and upwardly from said bottom to a top, a rear wall, and a front wall spaced from said rear wall, said front wall and said rear wall each having a top and extending in a direction transverse to said longitudinal axis to form a container for said liquid and solids, said front wall having a liquid inlet formed therein adjacent to said top of said front wall for supplying said liquid and said solids parallel to said longitudinal direction into said basin, said inlet having an upper surface;
    a transition duct having an arcuate shape generally in the form of a reverse "C" and provided with an upper arcuate section and a lower arcuate section; and
    means for mounting said transition duct against said front wall extending in said direction transverse to said longitudinal axis and horizontally with said upper arcuate section aligned with and facing said upper surface of said inlet and said lower arcuate section below said inlet.

11. Apparatus according to claim 10, said apparatus further comprising:
said transition duct having spaced ends, a length between said spaced ends in said transverse direction and a diameter, said length and said diameter being selected to provide a reduction in the kinetic energy of said liquid and the solids directed through said length and diameter of said into said basin.

12. Apparatus according to claim 10, further comprising:
said liquid inlet having a selected height;
said transition duct shape having a diameter selected to be within 1.5 to 2 times said selected height of said liquid inlet.

13. Apparatus according to claim 10, further comprising:
said basin also having a cross baffle extending vertically therein in said transverse direction and spaced in said longitudinal direction from said transition duct, said cross baffle having a bow-shaped leading surface.

14. Apparatus according to claim 13, further comprising:
said cross baffle having opposite vertically extending ends;
said basin having vertical baffles therein extending parallel to said longitudinal axis from said respective ends of said cross baffle to said rear wall, said baffles having a bottom spaced from the bottom of said basin and being spaced from said side wall to form a distributor passage; and
said transition duct having a length in said transverse direction to reduce the kinetic energy of said liquid and said solids in said duct and discharging into said basin a flow of said liquid and said solids adjacent to said top of said walls and in said distributor passage to said rear wall.

15. Apparatus according to claim 10, further comprising:
said transition duct being formed from one arcuate sheet having first and second edges at opposite ends of said arcuate shape,
said mounting means mounting said first and second edges of said sheet against said front wall, said mounted sheet extending across said inlet in said direction transverse to said longitudinal axis.

16. Apparatus according to claim 15, further comprising:
said lower arcuate section of said transition duct extending toward said front wall and toward said inlet to cause a helical transverse flow of said liquid and said solids in said transition duct toward each of said side walls adjacent to said tops thereof.

17. Apparatus according to claim 15, further comprising:
said transition duct having opposite arcuate ends, each of said ends being spaced from one of said side walls of said basin to define a space adjacent to said tops of said walls and between each said arcuate end and each said side wall of said basin;
one of said helical transverse flows of said liquid and said solids being discharged into each said space.

18. In an apparatus for settling solids from liquid in which the solids are suspended, said apparatus including a basin having a bottom, opposite side walls spaced by a width of said basin, a rear wall and a front wall having a top, said side walls extending in a longitudinal direction, said front wall extending in a direction transverse to said longitudinal direction, said basin having a clarifier therein for receiving said solids and said liquid at oppositely positioned clarifier inlets each of which is spaced from said bottom, said basin having at least one baffle having a transverse wall and a longitudinal portion for defining a longitudinal manifold in which said liquid and said solids flow to said clarifier inlet; the improvement comprising:
said front wall having an opening extending therethrough in said longitudinal direction, said opening having a first area for admitting said liquid and said solids to said basin, said opening having a top and a bottom; and
an arcuate, elongated channel having an elongated curved portion provided with a first edge and a second edge, said channel extending arcuately from said first edge to define an elongated open section terminating at said second edge, said channel having first and second ends and a length therebetween less than said width of said basin between said side walls;
said channel being secured to said front wall with said first edge of said elongated curved portion forming an extension of said top of said opening and said second edge of said channel attached to said front wall below said bottom of said opening, said channel being mounted generally centered between said side walls to define a space between each of said first and second ends of said channel and one of said side walls.

19. A method of controlling the flow of liquid into a container, said container having a top, a front wall, a bottom, a rear wall and opposite side walls extending between said top and said bottom for containing the liquid, comprising the steps of:
providing an inlet through said front wall adjacent to said top for receiving said liquid flowing in a first direction;
splitting said flowing liquid into two flow paths, each of said flow paths being centered on an axis transverse to said first direction and being helical; and
discharging said liquid in each of said helically transversely flowing paths into said container adjacent the top thereof.

20. A method of controlling flow according to claim 19, wherein said liquid flowing in said first direction has energy having a given value, further comprising:
defining a space adjacent to each of said side walls, said spaces being at the top of said walls; and
directing said liquid in said container toward said rear wall;
said discharging step being effective to discharge said helically flowing liquid into said space and then toward said rear wall to cause said energy of said liquid flowing toward said rear wall to have a value less than said given value.

21. A method of distributing liquid and solids to a basin provided with a top, a bottom, and an inlet wall; said inlet wall having an inlet therein, the method comprising:
providing said inlet in said inlet wall adjacent to said top of said basin;
flowing said liquid and said solids in a longitudinal path through said inlet;
turning said flowing liquid and solids from said longitudinal path into oppositely directed paths extending along said inlet wall adjacent to said top of said basin; and causing said liquid and solids in each of said oppositely directed paths to flow spirally.

22. The method of claim 21, wherein said liquid and said solids in said longitudinal path have an inlet kinetic energy having a first value; said basin having a rear wall, opposite side walls and a clarifier section provided with a longitudinal inlet near said bottom of said basin; said basin having baffles defining a longitudinal manifold having a top, a longitudinal bottom adjacent to and above said inlet of said clarifier section, and an end at said rear wall; said method further comprising the steps of:

defining a space between an end of each of said oppositely directed spirally flowing paths and one of said side walls;

discharging said liquid and said solids in said spirally flowing paths into said space; and guiding said discharged liquid and solids to said manifold, said discharging and guiding steps causing said liquid and solids to have kinetic energy having a second value substantially less than the value of said inlet kinetic energy, said liquid and solids having said second value flowing to said end of said manifold and down to said inlet of said clarifier section without a hydraulic jump in said manifold.

\* \* \* \* \*